(12) United States Patent
Shintani

(10) Patent No.: US 8,591,212 B2
(45) Date of Patent: Nov. 26, 2013

(54) TIRE VULCANIZER

(75) Inventor: Koji Shintani, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/391,612

(22) PCT Filed: May 10, 2011

(86) PCT No.: PCT/JP2011/060741
§ 371 (c)(1),
(2), (4) Date: Feb. 21, 2012

(87) PCT Pub. No.: WO2012/114542
PCT Pub. Date: Aug. 30, 2012

(65) Prior Publication Data
US 2013/0017287 A1    Jan. 17, 2013

(30) Foreign Application Priority Data

Feb. 25, 2011  (JP) .................................. 2011-040720

(51) Int. Cl.
*B29C 33/02* (2006.01)
(52) U.S. Cl.
USPC ........................................................ 425/41
(58) Field of Classification Search
USPC ............................................. 425/41; 249/78
See application file for complete search history.

(56) References Cited

U.S. PATENT DOCUMENTS

| | | | | |
|---|---|---|---|---|
| 1,682,620 A | * | 8/1928 | Ledwinka | ........................ 425/41 |
| 2,024,554 A | * | 12/1935 | Vogt | ................................ 425/41 |
| 2,456,063 A | * | 12/1948 | James | ............................. 425/41 |

FOREIGN PATENT DOCUMENTS

| | | |
|---|---|---|
| JP | H1-80306 U | 5/1989 |
| JP | 05-200754 A | 8/1993 |
| JP | 08-174554 A | 7/1996 |
| JP | 08-238626 A | 9/1996 |
| JP | 2002-036243 A | 2/2002 |
| JP | 2008-100513 A | 5/2008 |
| JP | 2010-000715 A | 1/2010 |

OTHER PUBLICATIONS

International Search Report for PCT/JP2011/060741, mailed Jul. 19, 2011.

* cited by examiner

*Primary Examiner* — James Mackey
(74) *Attorney, Agent, or Firm* — Kanesaka Berner & Partners, LLP

(57) ABSTRACT

To provide a tire vulcanizer capable of solving problems of an electrical heating platen, which relate to the deformation at the time of tire vulcanization and to the replacement of the platen. The tire vulcanizer vulcanizes and molds a green tire placed in an outer mold by heating the green tire from the outer side and the inner side of the green tire, and is featured by including an electric platen (10) which is arranged to be in contact with each of the upper and lower sides of a container with the green tire placed therein, or to be embedded in each of the upper and lower portions of the container, so as to heat the green tire from the outside of the outer mold at the time of vulcanization, and which is formed into a doughnut-like disc shape and divided into a plurality of sections in the circumferential direction of the platen (10).

6 Claims, 8 Drawing Sheets

TIRE VULCANIZER

CROSS-REFERENCE TO RELATED APPLICATION

The present application is the U.S. National Stage of International Application No. PCT/JP2011/060741,, filed on May 10, 2011;, which Application claims priority benefit of Japanese Application No. 2011-040720,, filed Feb. 25, 2011.

TECHNICAL FIELD

The present invention relates to a tire vulcanizer which vulcanizes and molds a green tire.

BACKGROUND ART

Conventionally, in a tire vulcanizer which vulcanizes and molds a green tire, an outer mold (mold), in which the green tire is placed, is heated, and the inner wall surface of the green tire is pressed toward the outer mold while being heated by a high-temperature and high-pressure heating medium being supplied to the inner space of the green tire (to the inside of the bladder). Then, the outer side and the inner side of the green tire are heated by the heated outer mold and the heating medium supplied to the inner space of the green tire, and thereby the green tire is vulcanized.

Note that the conventional tire vulcanizer is configured such that steam as a heating medium is supplied into and circulated through the inner space of the green tire, and such that a heated and pressurized medium, such as nitrogen gas and warm water, is sealed in the inner space.

As a prior art of the tire vulcanizer described above, in which a green tire is heated from the outside thereof, there is an apparatus using a heat medium, as disclosed, for example, in Patent Literatures 1, and 2. In the prior art, a platen (heat plate) is arranged on each of the upper and lower sides of an outer mold in which a green tire is placed, and steam as a heat medium is supplied to the inside of both the platens, so that heat is transferred to the green tire from the outside of the outer mold.

On the other hand, as for a tire vulcanizer in recent years, instead of the above-described heating technique using the heat medium, a heating technique using an electric platen has been proposed from the viewpoint of energy saving, and the like.

As electric heating methods applied to the electric platen, there are known a heating method using a rod-shaped or planar electric heater embedded in the platen (see, for example, Patent Literature 3, described below), and an induction heating method using an electromagnetic coil (see, for example, Patent Literature 4, described below).

Further, the conventional platen described above is formed into a one-piece structure having a doughnut-like disc shape, for facilitating the formation of a heat medium flow path, the attachment to the mold, and the like. However, Patent Literature 5, described below discloses a tire vulcanizing mold in which, in order to obtain a uniform degree of vulcanization over the whole of a tire, the platen is divided in the radial direction thereof, and the rates of temperature increase of heating sections are correspondingly changed.

CITATION LIST

Patent Literature

{PTL 1}
  Japanese Unexamined Patent Application, Publication No. 5-200754
{PTL 2}
  Japanese Unexamined Patent Application, Publication No. 8-238626
{PTL 3}
  Japanese Unexamined Patent Application, Publication No. 2002-36243
{PTL 4}
  Japanese Unexamined Patent Application, Publication No. 2008-100513
{PTL 5}
  Japanese Unexamined Patent Application, Publication No. 8-174554

SUMMARY OF INVENTION

Technical Problem

For example, as in an external view shown in FIG. 10, a conventional platen 5 of an electric heating type has a doughnut-like disc shape in the center portion of which a circular through hole 6 is formed, and has a structure in which heat generating sections 7, such as rod-shaped heaters, are embedded. For this reason, in the case where a platen is changed to an electric platen from the viewpoint of energy saving, and the like, the following problems are caused because the platen 5 has the one-piece structure having the doughnut-like disc shape.

The first problem is that, at the time of tire vulcanization, deformation (deflection) is easily generated in the circular platen. For this reason, the life of a heat generating section, such as an electric heater, embedded in the platen, and the life of an attaching member, and the like, are reduced under the influence of the stress generated due to the deformation of the platen. Also, the deformation of the platen means that the contact area between the outer mold and the heat generating section is reduced, and hence the heat transfer property (heating efficiency) between the outer mold and the heat generating section is reduced. Further, when the heat transfer property between the outer mold and the heat generating section is reduced, the temperature of the heat generating section is increased to an unexpected high temperature, and thereby the thermal life of the heat generating section is reduced.

The second problem relates to the replacement of the platen at the time of maintenance, and the like, and is that, in the work of replacing the platen having the one-piece structure, much time is required for the removal of and the attachment and adjustment of the platen. Further, when the platen is replaced due to a failure, or the like, the entire platen must be collectively replaced, which is disadvantageous from the viewpoint of cost.

The present invention has been made in view of the above described circumstances. An object of the present invention is to provide a tire vulcanizer capable of solving the problems of the electrical heating platen, which relate to the deformation at the time of tire vulcanization and to the replacement of the platen.

Solution to Problem

The present invention adopts the following means in order to solve the above-described problems.

A tire vulcanizer according to the present invention, which vulcanizes and molds a green tire placed in an outer mold by heating the green tire from the outside and the inside of the green tire, is featured by including an electric platen which is arranged to be in contact with each of the upper and lower sides of a container with the green tire placed therein, or to be embedded in each of the upper and lower portions of the container, so as to heat the green tire from the outside of the outer mold at the time of vulcanization, and which is formed into a doughnut-like disc shape and divided into a plurality of sections in the circumferential direction of the platen.

The tire vulcanizer according to the present invention includes the electric platen which is arranged to be in contact with each of the upper and lower sides of the container with a green tire placed therein, or to be embedded in each of the upper and lower portions of the container, so as to heat the green tire from the outside of the outer mold at the time of vulcanization, and which is formed into the doughnut-like disc shape and divided into the plurality of sections in the circumferential direction of the platen. Therefore, the platen is hardly deformed at the time of tire vulcanization.

It is preferred that, in the tire vulcanizer of the above-described invention, the platen is divided into a plurality of sections in the radial direction of the platen and is formed into a doughnut-like disc shape by connecting the innermost sides of the divided sections in the circumferential direction. Thereby, the platen is more hardly deformed at the time of tire vulcanization. In this case, the divided platens are connected and formed into the doughnut-like disc shape at the innermost center portion of the platen, and hence a small diameter hole is formed at the center portion of the platen, so that the hole can be used for the centering at the time of attaching the platen.

It is preferred that, in the tire vulcanizer of the above-described invention, the platen includes a concave-convex engaging section in which concave and convex sections of the mutually adjacent divided platens of the plurality of divided platens are engaged with each other to make the mutually adjacent divided platens connected together and positioned.

Further, in the tire vulcanizer of the above-described invention, the platen may include a fastening connecting section in which the mutually adjacent divided platens of the plurality of divided platens are connected together and positioned by a fastening member.

Further, in the tire vulcanizer of the above-described invention, the platen may be configured to include a plate connecting section in which the mutually adjacent divided platens of the plurality of divided platens are connected together and positioned via a plate-shaped member.

Alternatively, in the tire vulcanizer of the above-described invention, the platen may be divided into a plurality of divided platens of which the mutually adjacent divided platens are provided therebetween with two or more of the concave-convex engaging section, the fastening connecting section and the plate connecting section.

The mutually adjacent divided platens can be easily positioned and connected with each other by the concave-convex engaging section, the fastening connecting section, and the plate connecting section, and by a combination of the concave-convex engaging section, the fastening connecting section, and the plate connecting section.

In the tire vulcanizer having the above-described configuration, the connection and positioning in the plate connecting section may be performed in such a manner that the concave-convex section provided on the upper surface or the lower surface of the platen is engaged with the concave-convex section provided on the lower surface or the upper surface of the plate-shaped member. Alternatively, in the plate connecting section, the platen and the plate-shaped member are connected together and positioned via a fastening member.

Advantageous Effects of Invention

According to the present invention described above, the electrical heating platen of the tire vulcanizer is configured to be divided into a plurality of sections in the circumferential direction, and hence the platen is hardly deformed by the load at the time of tire vulcanization, as a result of which the heating efficiency, the durability, and the reliability of the platen are improved. Further, the structure, in which the electrical heating platen is divided into a plurality of sections in the circumferential direction, facilitates the work of attaching and removing the platen and the work of replacing the platen, and hence is effective for improving the maintainability of the platen.

Further, when the electrical heating platen is replaced, the replacement can be performed for each of the divided platens, and hence the cost required for replacing the components can be reduced.

Further, the structure, in which the electrical heating platen is divided into a plurality of sections, enables an optimum division shape to be selected in correspondence with the structure of the vulcanizer, the tire mold, and the heating specification, and hence is effective for improving the degree of freedom of apparatus design. That is, since the electric heating method, in which a rod-shaped heater and a planar heater are combined together, can be easily used, and since the electric heating method and the heat-medium heating method are also easily combined together, the tire heating temperature can be made uniform and optimized. Thereby, the running cost for heating is reduced, and the accuracy of the heating temperature control is improved, as a result of which a tire vulcanizer capable of manufacturing a high quality tire is provided.

BRIEF DESCRIPTION OF DRAWINGS

FIG. 1A is a plan view showing a structure of a platen (heat plate) as an embodiment of a tire vulcanizer according to the present invention.

FIG. 1B is a view showing the structure of the platen (heat plate) as the embodiment of the tire vulcanizer according to the present invention, and is a longitudinal sectional view (sectional view taken along line A-A) in FIG. 1A.

FIG. 2 is a longitudinal sectional view showing a configuration example of a tire vulcanizer provided with the platen shown in FIG. 1.

FIG. 3 is a plan view showing a first modification of the platen shown in FIG. 1.

FIG. 4 is a plan view showing a second modification of the platen shown in FIG. 1.

FIG. 5A is a view showing a structural example of a concave-convex engaging section, and showing a structural example in which the upper and lower surfaces of the divided platens adjacent to each other are overlapped and engaged with each other at the end portions of the divided platens.

FIG. 5B is a view showing a structural example of a concave-convex engaging section, and showing a structural example in which the upper and lower surfaces of the divided platens adjacent to each other are overlapped and engaged with each other at the end portions of the divided platens.
FIG. 5C is a view showing a structural example of a concave-convex engaging section, and showing a structural example in which the end surfaces of the divided platens adjacent to each other are engaged with each other.
FIG. 5D is a view showing a structural example of a concave-convex engaging section, and showing a structural example in which the end surfaces of the divided platens adjacent to each other are engaged with each other.
FIG. 6A is a view showing a structural example of a fastening connecting section, and showing a structural example in which concave-convex surfaces formed at the end portions of the divided platens adjacent to each other are vertically overlapped and fastened together by a bolt.
FIG. 6B is a view showing a structural example of a fastening connecting section, and showing a structural example in which concave and convex portions formed at the end portions of the divided platens adjacent to each other are engaged and fastened together by a through-bolt.
FIG. 7 is a front view showing an appearance of a platen formed by connecting divided platens to each other via a plate-shaped member.
FIG. 8A is a view showing a structural example of a plate connecting section, and is a longitudinal sectional view showing an example of a plate connecting section.
FIG. 8B is a view showing a structural example of a plate connecting section, and is a plan view showing an arrangement example of concave-convex sections of a divided platen.
FIG. 8C is a view showing a structural example of a plate connecting section, and is a plan view showing an arrangement example of a concave-convex section of a divided platen.
FIG. 9A is a view showing a structural example of a plate connecting section, and showing a structural example in which a divided platen and a plate-shaped member are fastened by a vertical bolt.
FIG. 9B is a view showing a structural example of a plate connecting section, and showing a structural example in which a divided platen and a plate-shaped member are fastened by a horizontal bolt.
FIG. 10A is a plan view showing an appearance of a platen used for a tire vulcanizer.
FIG. 10B is a view showing an appearance of the platen used for the tire vulcanizer, and is a front view of FIG. 10A.

DESCRIPTION OF EMBODIMENTS

In the following, an embodiment of a tire vulcanizer according to the present invention will be described with reference to the accompanying drawings.

Figure 2:
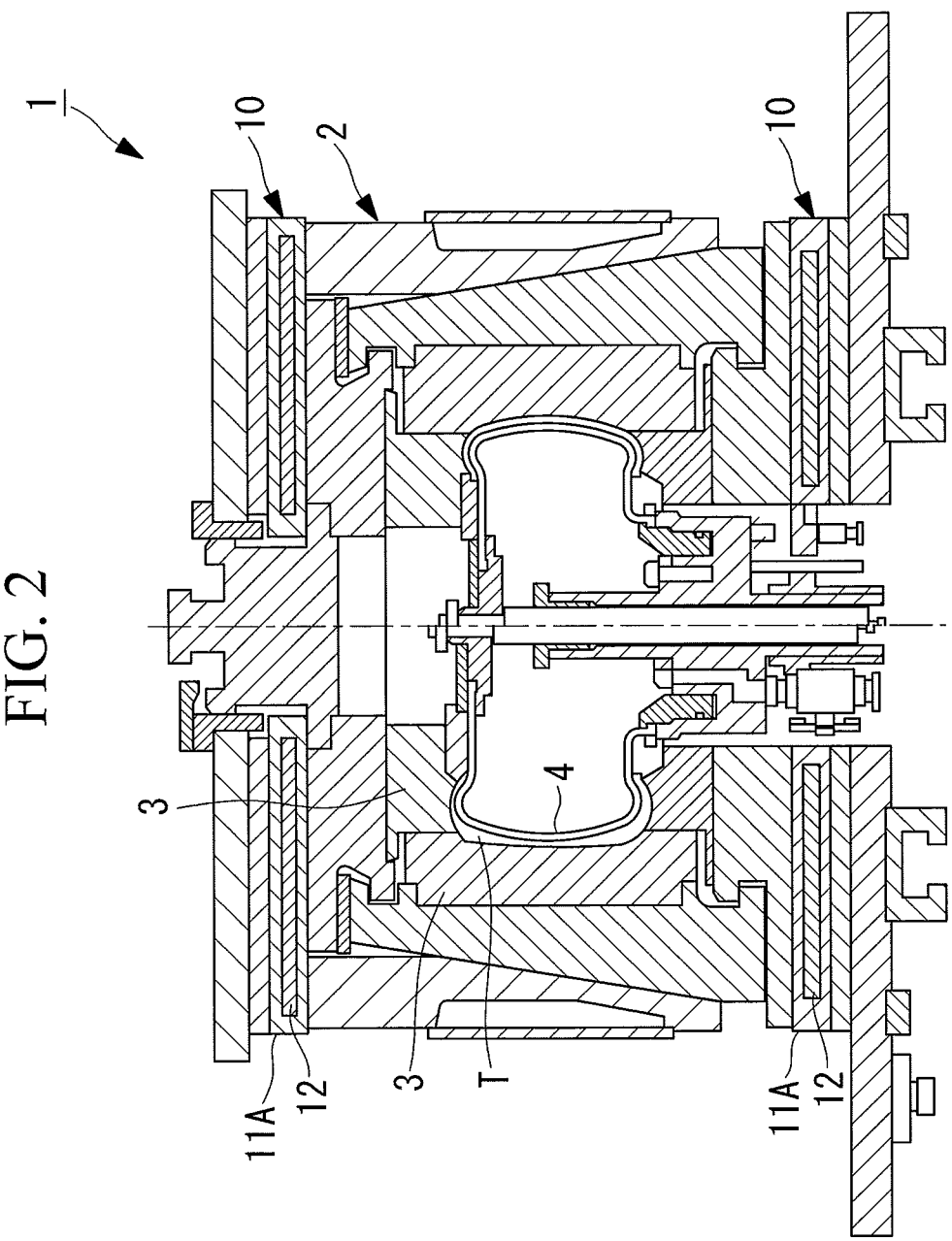
{FIG. 2}

A tire vulcanizer 1 shown in FIG. 2 is an apparatus which heats and vulcanizes a green tire T in a container (mold) 2. The container 2 is configured by including an outer mold (mold) 3 in which the green tire T is placed, and a bladder 4 which forms the inner space of the tire.

Note that the outer mold 3 described above is divided into a plurality of members in order that the green tire T can be placed in the outer mold 3 and that the tire after vulcanization can be taken out from the outer mold 3.

In the tire vulcanizer 1, the outer mold 3, in which the green tire T is placed, is heated, and also a high-temperature and high-pressure heating medium is supplied to the inside of the bladder 4 forming the inner space of the green tire T, so that the inner wall surface of the green tire T is pressed toward the outer mold 3 while being heated. As a result, the inner and outer sides of the green tire T are heated by the heated outer mold 3 and the heating medium supplied to the inside of the bladder 4, and thereby the green tire T is vulcanized and molded.

In the case of the tire vulcanizer 1 shown in FIG. 2, the green tire T placed in the outer mold 3 is heated by separate platens (heat plates) 10 respectively arranged on the upper and lower sides of the container 2, but the tire vulcanizer 1 may also have a structure in which the platen 10 is incorporated in the upper portion or the lower portion of the container 2. The platen 10 is an electric platen formed by embedding a heat generating section 12, such as a rod-shaped heater and a planar heater, in a main body 11 having a doughnut-like disc shape. Note that, in the following description, the platen 10 arranged on the upper surface of the container 2 is exemplified. However, when the platen 10 is arranged on the lower surface of the container 2 or when the platen 10 is incorporated in the container 2, the basic structure of the platen is substantially the same as that of the platen arranged on the upper surface of the container 2, and only the upper and lower sides are reversed.

Figure 1A:
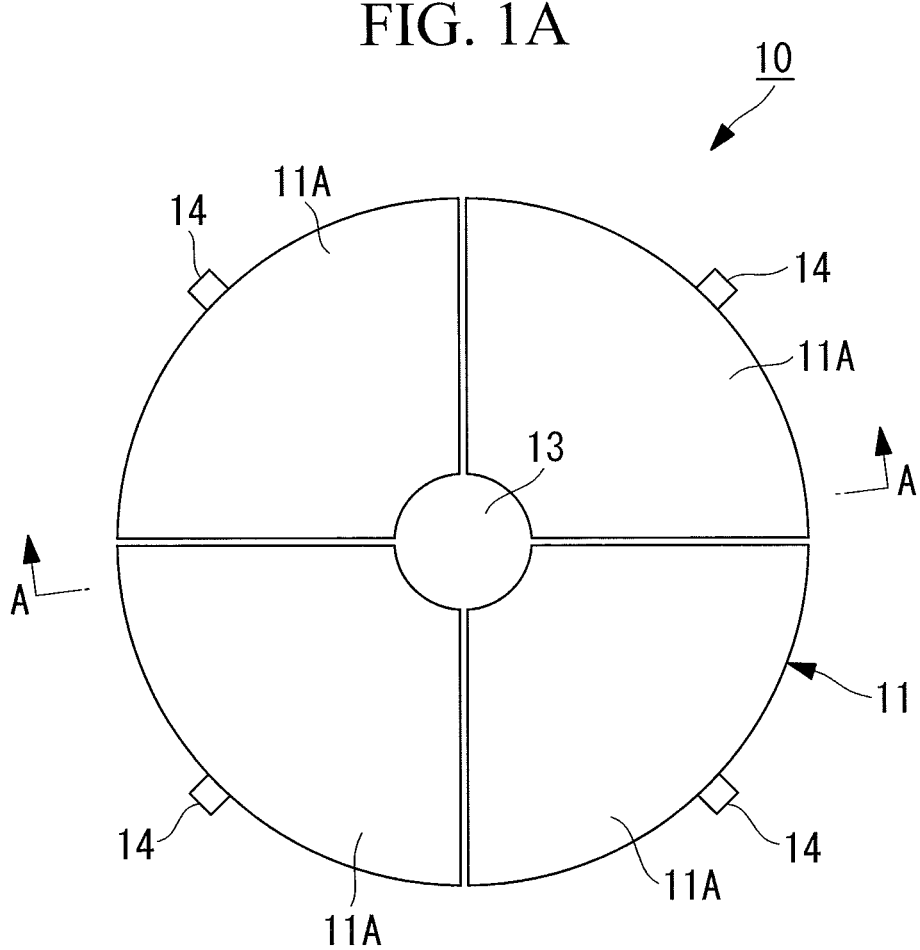
{FIG. 1A}

In the platen 10 having the doughnut-like disc shape shown in FIG. 1A, the main body 11 is formed to have a circular shape, and a concentric through hole 13 is provided at the center portion of the main body 11. Further, the main body 11 of the platen 10 is divided into four sections at angular intervals of 90, degrees in the circumferential direction.

In the following description, each of the four sections formed by dividing the platen 10 in the circumferential direction is referred to as a divided platen 11A. That is, the four divided platens 11A, in each of which the independent heat generating section 12 is embedded, are connected to each other by concave-convex engaging sections 40 (see FIG. 5), and the like, in other words, the divided platens 11A, each of which has a substantially one-quarter circular shape and in each of which the heat generating section 12 is embedded, are integrally connected to each other, whereby the platen 10 shown in FIG. 1A is formed into a doughnut-like disc shape, at the center portion of which the through hole 13 for centering is formed.

Further, reference numeral 14 in FIG. 1A denotes a flange section for connecting the platen 10 to the container 2, and the flange section is provided for each of the quadripartite divided platens 11A in the configuration example shown in FIG. 1A. The positioning accuracy of the divided platens 11A, which are integrally connected to each other to form the platen 10 having the through hole 13 used to center the installation position of the outer mold 3, is further improved by providing such flange sections 14.

In the tire vulcanizer 1 configured in this way, the platen 10 formed by connecting the divided platens 11A is arranged on each of the upper and lower sides of the container 2 in which the green tire T is placed. Therefore, at the time of vulcanization, the green tire T is heated, from the outside of the container 2 and of the outer mold 3, by the electric heat generating section 12 embedded in each of the divided platens 11A, and hence the platen 10 is hardly deformed even when receiving a load at the time of vulcanization. That is, the platen 10 is hardly deformed because of its structure divided in the circumferential direction, and hence a large stress is hardly generated in the platen 10.

Note that the number of division of the platen 10 in the circumferential direction is not limited to four described above, and the platen 10 may, of course, be bisected or trisected. Further, the platen 10 may also be divided into five sections or more according to the size, and the like, of the tire to be vulcanized.

Meanwhile, the platen 10 of the embodiment described above is formed into the doughnut-like disc shape by connecting the divided platens 11A quadrisected only in the circumferential direction. However, as in a first modification shown in FIG. 3, and a second modification shown in FIG. 4, the platen 10 may also be divided into a plurality of sections in the radial direction in addition to the circumferential direction.

In this case, it is preferred that the innermost section, that is, the center side section, in which the through hole 13 is formed, is formed into a doughnut shape continuous in the circumferential direction.

Figure 3:
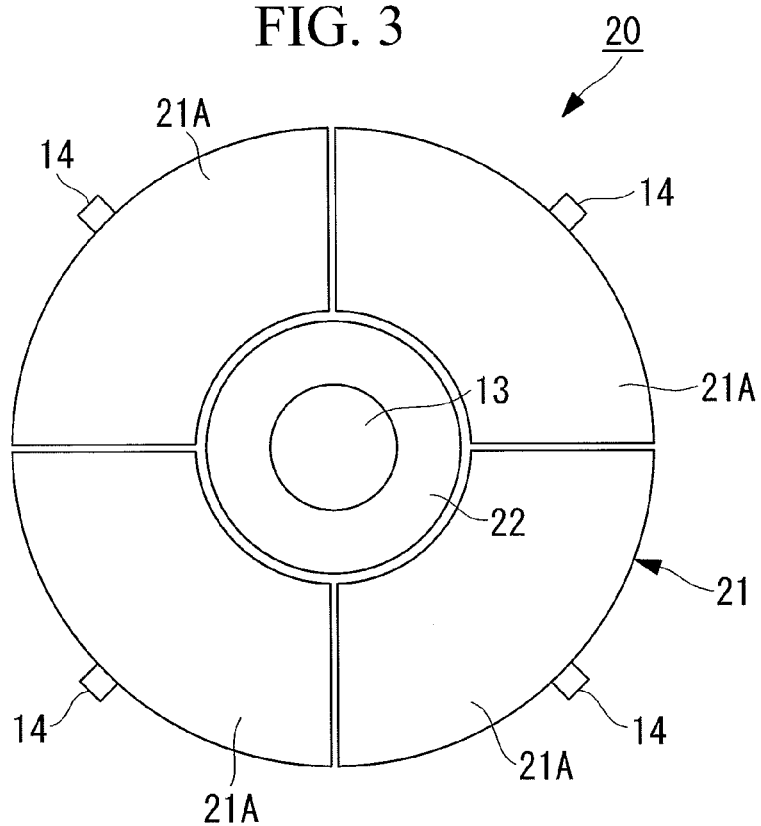
{FIG. 3}

In the following, a platen 20 according to the first modification shown in FIG. 3 is specifically described. The platen 20 is configured such that an inner ring 22, in which the through hole 13 is formed, is left at the center portion of a main body 21 of the platen 20, and such that the outer circumferential side of the main body 21 is divided into four divided platens 21A in the circumferential direction. That is, the platen 20 shown in FIG. 3 has a divided structure in which the main body 21 is radially divided into the inner ring 22 and the four divided platens 21A divided in the circumferential direction. As a result, the platen 20, which is divided in the radial direction as well as in the circumferential direction, is more hardly deformed at the time of tire vulcanization.

Further, the inner ring 22, which is a divided platen having a doughnut-like disc-shape and formed at the innermost central portion of the platen 20, has the through hole 13 which is a small diameter hole formed at the center portion of the platen 20. Therefore, the through hole 13 can be used for centering the platen 20 at the time when the platen 20 is attached to the outer mold 3. That is, higher centering accuracy can be obtained by providing the inner ring 22 which is not divided in the circumferential direction.

Figure 4:
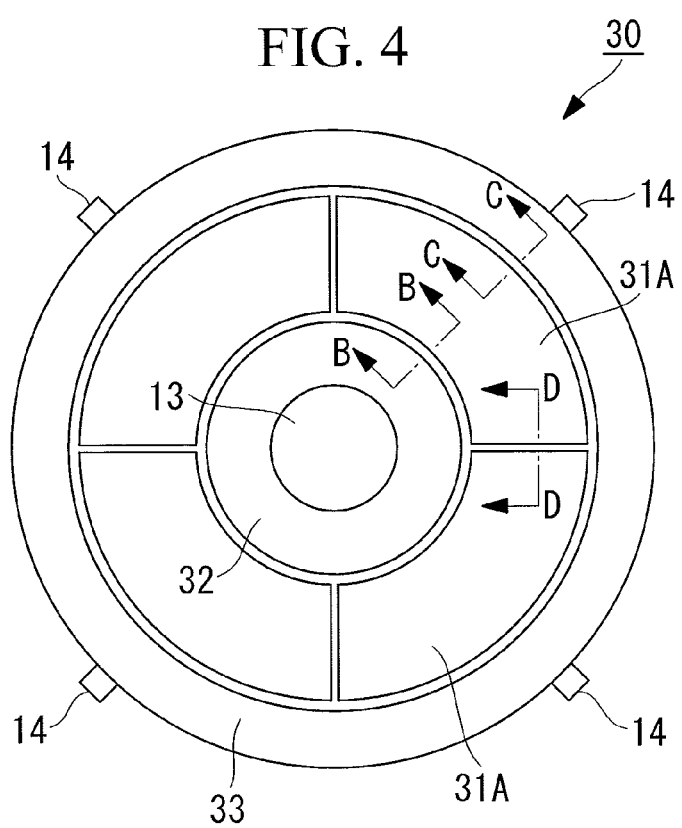
{FIG. 4}

Further, a platen 30 of a second modification shown in FIG. 4 is formed by also radially dividing the outer peripheral side of the platen 20 shown in FIG. 3. That is, the platen 30 shown in FIG. 4 has a divided structure in which a main body 31 is radially divided into an inner ring 32, an outer ring 33, and four divided platens 31A divided in the circumferential direction. Note that the division in the radial direction is not limited to the division into the inner ring 32 and the outer ring 33, and may be suitably changed, for example, as in such a case where the divided platen 31A is also radially divided into a plurality of sections.

In this structure, in the case where the diameter of the platen 30 is larger than the container 2, the heat generating body of the outer ring 33 located on the outermost side of the platen 30 is not needed. Also, the kind of the heat generating body and the heating temperature can be suitably changed for each of the divided portions of the platens 30. Therefore, the design flexibility in the arrangement, selection, and the like, of the heat generating bodies can be increased.

Subsequently, there will be described connection structures for connecting and positioning the mutually adjacent divided rings of the divided platens 11A, 21A and 31A, the inner rings 22 and 32, and the outer ring 33, which are formed by the division in the circumferential and radial directions. That is, examples of connection structures shown in the sectional views taken along lines B-B, C-C and D-D in FIG. 4 will be described with reference to the accompanying drawings.

Figure 5A:
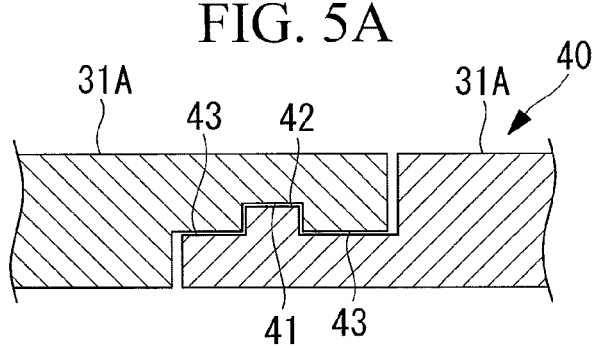
{FIG. 5A}
Figure 5B:
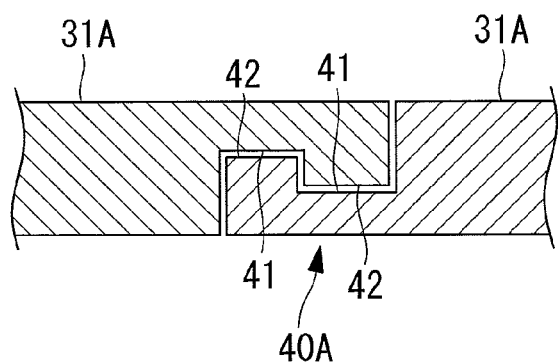
{FIG. 5B}
Figure 5C:
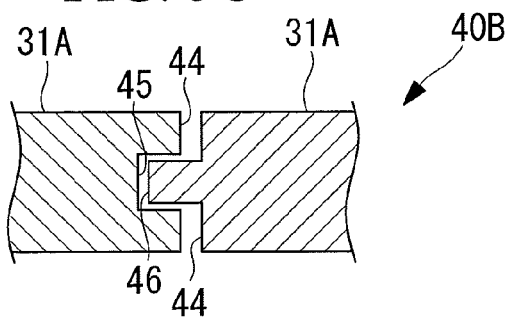
{FIG. 5C}
Figure 5D:
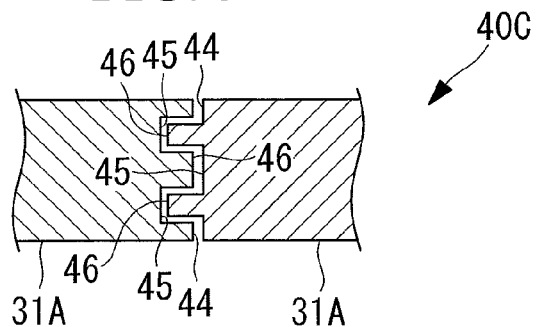
{FIG. 5D}

FIG. 5A to FIG. 5D show structural examples of concave-convex engaging sections. FIG. 5A and FIG. 5B show structural examples in which the upper and lower surfaces at the end portions of the divided platens adjacent to each other are overlapped and engaged with each other. FIG. 5C and FIG. 5D show structural examples in which the end surfaces of the divided platens adjacent to each other are engaged with each other.

Here, in the case where FIG. 5A is a sectional view taken along line D-D in FIG. 4 and shows the concave-convex engaging section 40, a concave section 41 and a convex section 42, which are engaged with each other in a manner of being vertically overlapped with each other, are respectively provided on the upper and lower surfaces of the divided platens 31A and 31A. The concave and convex sections 41 and 42 are respectively formed on mutually facing stepped surfaces 43 which are respectively provided at the end portions of the divided platens 31A and 31A. In the state where the concave and convex sections 41 and 42 are engaged and connected with each other, each of the front and back surfaces of the platen 30 having a disc shape maintains flatness, and the divided platens 31A and 31A are prevented from being horizontally moved (positionally deviated).

As described above, each of the concave and convex sections 41 and 42 may be formed substantially at the center of each of stepped surfaces 43. Alternatively, as in a concave-convex engaging section 40A shown in FIG. 5B, the concave and convex sections 41 and 42 formed at the end portion of one of the divided platens 31A and 31A may be engaged with the concave and convex sections 41 and 42 formed at the end portion of the other of the divided platens 31A and 31A. In this way, the connection structure of the divided platens is not limited to the above-described structural examples, and the like.

Further, as shown in FIG. 5C and FIG. 5D, the connection structure of the divided platens 31A and 31A adjacent to each other may also be configured as concave-convex engaging sections 40B and 40C in which one or plurality of concave and convex sections 45 and 46 are provided on the end surfaces 44 of the divided platens 31A and 31A so as to be engaged with each other in the horizontal direction. In this case, the side surfaces of the concave and convex sections 45 and 46 are slid in the horizontal direction so as to make the concave and convex sections 45 and 46 engage each other, and hence the divided platens 31A and 31A are prevented from being moved in the vertical direction.

Next, structural examples of fastening connecting sections shown in FIG. 6A and FIG. 6B will be described.

Figure 6A:
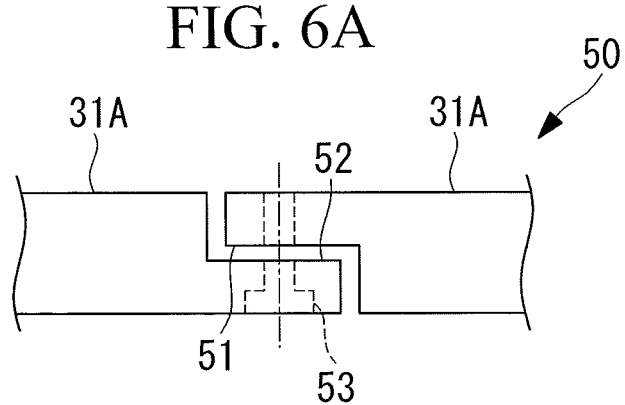
{FIG. 6A}
Figure 6B:
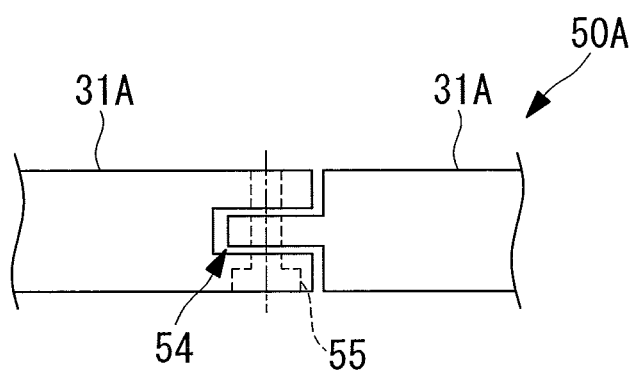
{FIG. 6B}

A fastening connecting section 50 shown in FIG. 6A has a structure in which stepped surfaces 51 and 52 are respectively formed at the end portions of the divided platens 31A and 31A adjacent to each other, and in which the stepped surfaces 51 and 52 are mechanically connected to each other by using a bolt 53 as a fastening member. Further, a fastening connecting section 50A shown in FIG. 6B has a structure in which a concave-convex engaging section 54 is formed at the end portions of the divided platens 31A and 31A adjacent to each other, and in which the divided platens 31A and 31A are mechanically connected to each other by using a through-bolt 55, as a fastening member, passing through the concave-convex engaging section 54.

When such fastening connecting sections 50 and 50A are adopted, the divided platens 31A and 31A are mechanically connected to each other by the fastening member, and hence the divided platens 31A and 31A can be integrated with each other by being positioned and surely connected to each other.

Finally, structural examples of plate connecting sections shown in FIG. 7 to FIG. 9 will be described.

Figure 1B:
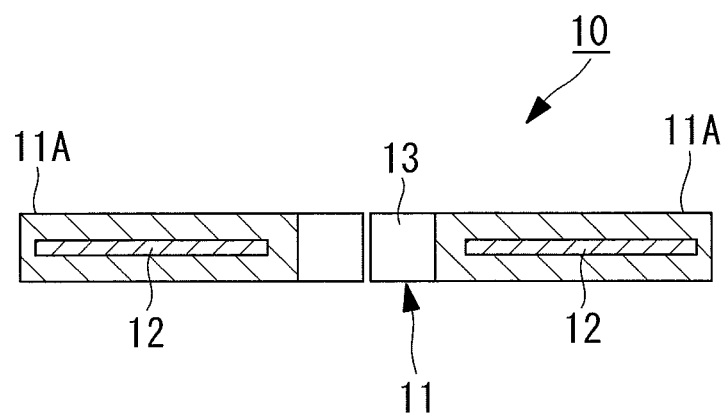
{FIG. 1B}
Figure 7:
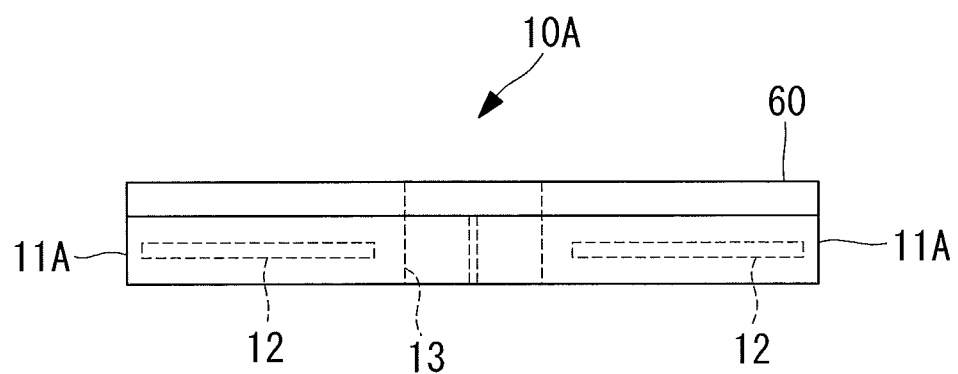
{FIG. 7}
Figure 8A:
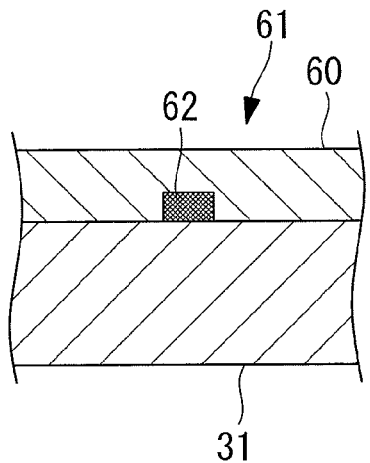
{FIG. 8A}

A platen 10A shown in FIG. 7 has a structure in which the divided platens 11A of the platen 10 shown in FIG. 1B are integrated with each other by being connected and positioned by a plate-shaped member 60. In this case, as the plate-shaped member 60, for example, a plate material having a continuous ring shape is used in correspondence with the doughnut-like disc shape of the platen 10A.

The plate-shaped member 60 described above is, for example, as shown in FIG. 8A, connected to the divided platen 11A by a concave-convex engaging section 62 in a plate connecting section 61. The concave-convex engaging section 62 has a structure in which the concave and convex sections that are engaged with each other are respectively provided on the contact surfaces of the plate-shaped member 60 and the divided platen 11A, so as to be engaged with each other. In this case, the concave-convex engaging section 62 may be configured such that the concave section of the concave-convex engaging section 62 is provided on the plate-shaped member 60, and such that the convex section of the concave-convex engaging section 62 is provided on the divided platen 11A, or vice versa.

Figure 8B:
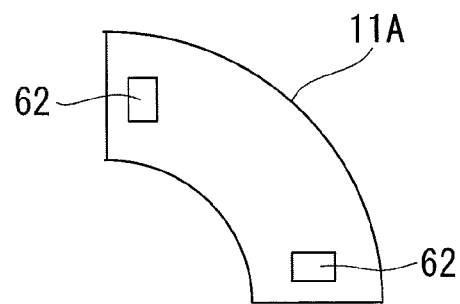
{FIG. 8B}
Figure 8C:
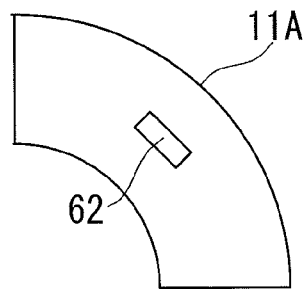
{FIG. 8C}

Further, as for the position of the concave-convex engaging section 62, for example, as shown in FIG. 8B, a pair of the concave-convex engaging sections 62 may be respectively provided near the both ends of the divided platen 11A, or, for example, as shown in FIG. 8C, the concave-convex engaging section 62 may be provided at a position close to the center portion of the divided platen 11A.

Further, the plate-shaped member 60 described above may be, for example, as shown in FIG. 9A and FIG. 9B, positioned and connected with the divided platen 11A by using a fastening member, such as a bolt.

Figure 9A:
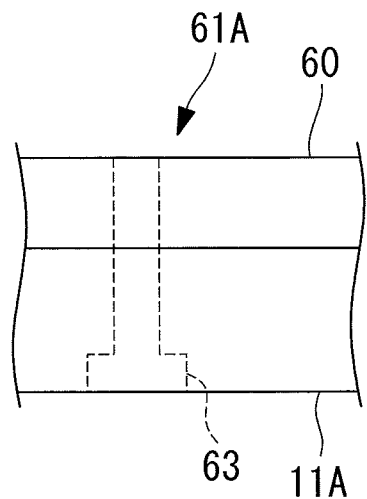
{FIG. 9A}
Figure 9B:
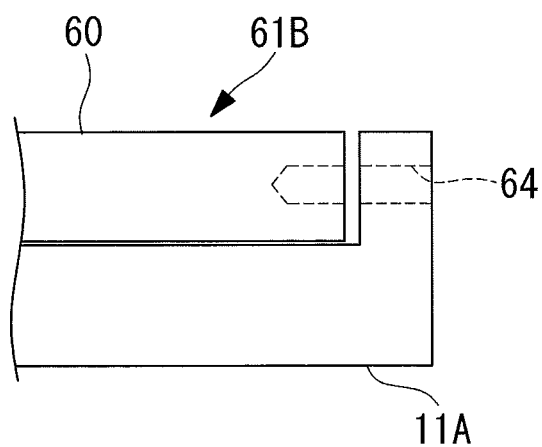
{FIG. 9B}
Figure 10A:
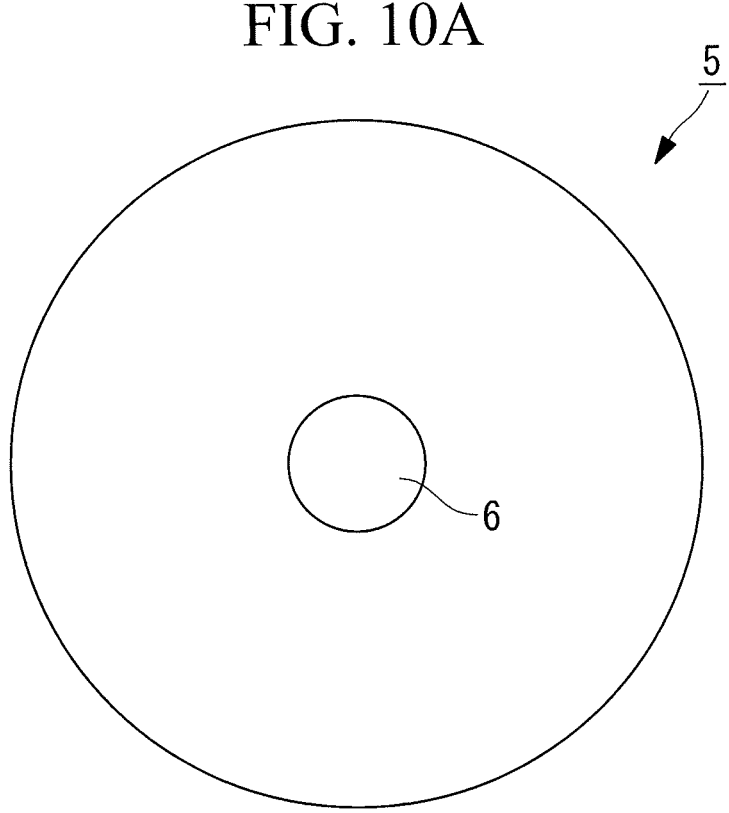
{FIG. 10A}
Figure 10B:
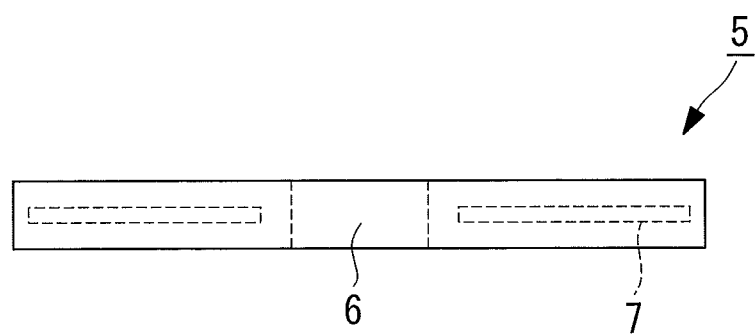
{FIG. 10B}

In a structural example of the plate connecting section 61A shown in FIG. 9A, the divided platen 11A and the plate-shaped member 60 are connected with each other by a bolt 63 extending in the vertical direction. In a structural example of a plate connecting section 61B shown in FIG. 9B, the divided platen 11A and the plate-shaped member 60 are connected with each other by a bolt 64 extending in the horizontal direction.

In the tire vulcanizer 1 described above, each of the platens 10, 20 and 30 may be divided into the plurality of divided platens of which the mutually adjacent divided platens 11A, 21A, and 31A and each of the inner rings 22 and 32 and the outer ring 33 are provided therebetween with two or more of the concave-convex engaging section 40, the fastening connecting section 50 and the plate connecting section 61. That is, in the platen formed by integrally connecting the plurality of divided platens to each other, a connection structure can be provided by suitably combining the concave-convex engaging section 40, the fastening connecting section 50, and the plate connecting section 61, and hence the positioning and connection between the divided platens can be easily performed by optimizing the connection structure.

In this way, in the tire vulcanizer 1 according to the present embodiment described above, the platens 10, 20 and 30 respectively having the divided shapes are formed in such a manner that the electrical heating platen having the integrated disk shape is divided into the plurality of divided platens in the circumferential direction, and hence the following operation effects can be obtained.

1) The platen is hardly deformed (deflected) at the time of tire vulcanization, and hence the lives of the heat generating section, the attaching members (for example, a flange section, an upper and lower plates, and a fastening member, such as a bolt), and the like, are improved.

2) With the platen which is hardly deformed, the contact area between the platen and the heat generating section is hardly changed, and hence the heat transfer property is not lowered, as a result of which an excellent heating efficiency is obtained and also the thermal life of the heat generating section is improved.

3) When the platen is replaced, the platen can be easily removed and can be easily attached and adjusted, and hence the maintainability is improved.

4) The platen, a part of which can be replaced for each of the divided platens, is effective to reduce the cost.

5) An optimum division shape of the platen can be selected in correspondence with the structure of a tire vulcanizer, the mold structure of a container, and heating specifications.

6) In the platen, a combination of different kinds of electric heating methods, such as a method using an electric heater (including a combination of a rod-shaped heater and a planar heater) and an induction heating method, or a combination of the electric heating method and a heat-medium heating method can be easily used for each divided platen. Thereby, since the heating temperature of a tire can be made uniform and optimized, the running cost for heating can be reduced, and the control accuracy of heating temperature can be improved, as a result of which a tire with high quality can be manufactured.

In this way, the tire vulcanizer 1 according to the embodiment described above can solve the problems of the electrical heating platen, which relate to the deformation at the time of tire vulcanization and to the replacement of the platen.

Note that the present invention is not limited to the above described embodiment, and can be suitably modified within the scope and spirit of the present invention.

REFERENCE SIGNS LIST

1 Tire vulcanizer
2 Container (mold)
3 Outer mold (mold)
4 Bladder
10, 20, 30 Platen
11A, 21A, 31A Divided platen
12 Heat generating body
13 Through hole
14 Flange section
40 Concave-convex engaging section
50 Fastening connecting section
60 Plate-shaped member
61

The invention claimed is:

1. A tire vulcanizer which vulcanizes and molds a green tire placed in an outer mold by heating the green tire from the outer side and the inner side of the green tire, the tire vulcanizer comprising:
an electric platen which is arranged to be in contact with each of the upper and lower sides of a container with the green tire placed therein, or to be embedded in each of the upper and lower portions of the container, so as to heat the green tire from the outside of the outer mold at the time of vulcanization, and is formed into a doughnut-like disc shape and divided into a plurality of sections in the circumferential direction of the platen, wherein the platen is divided into a plurality of sections in the radial direction and is formed into the doughnut-like disc shape by mutually connecting the innermost sides of the divided sections in the circumferential direction.

2. A tire vulcanizer which vulcanizes and molds a green tire placed in an outer mold by heating the green tire from the outer side and the inner side of the green tire, the tire vulcanizer comprising:

an electric platen which is arranged to be in contact with each of the upper and lower sides of a container with the green tire placed therein, or to be embedded in each of the upper and lower portions of the container, so as to heat the green tire from the outside of the outer mold at the time of vulcanization, and is formed into a doughnut-like disc shape and divided into a plurality of sections in the circumferential direction of the platen, wherein the platen includes a concave-convex engaging section in which concave and convex sections of at least two of the sections of the plurality of sections, which are adjacent to each other, are connected to each other and positioned by being engaged with each other.

3. A tire vulcanizer which vulcanizes and molds a green tire placed in an outer mold by heating the green tire from the outer side and the inner side of the green tire, the tire vulcanizer comprising:

an electric platen which is arranged to be in contact with each of the upper and lower sides of a container with the green tire placed therein, or to be embedded in each of the upper and lower portions of the container, so as to heat the green tire from the outside of the outer mold at the time of vulcanization, and is formed into a doughnut-like disc shape and divided into a plurality of sections in the circumferential direction of the platen, wherein the platen includes a fastening connecting section in which at least two of the sections of the plurality of sections, which are adjacent to each other, are connected to each other and positioned by a fastening member.

4. A tire vulcanizer which vulcanizes and molds a green tire placed in an outer mold by heating the green tire from the outer side and the inner side of the green tire, the tire vulcanizer comprising:

an electric platen which is arranged to be in contact with each of the upper and lower sides of a container with the green tire placed therein, or to be embedded in each of the upper and lower portions of the container, so as to heat the green tire from the outside of the outer mold at the time of vulcanization, and is formed into a doughnut-like disc shape and divided into a plurality of sections in the circumferential direction of the platen, wherein the platen is divided into a plurality of sections, at least two of the sections of the plurality of sections being provided therebetween with two or more of a concave-convex engaging section, a fastening connecting section or a plate connecting section, wherein, in the concave-convex engaging section, concave and convex sections of the plurality of sections are connected to each other and positioned by being engaged with each other, wherein, in the fastening connecting section, the sections of the plurality of sections are connected to each other and positioned by a fastening member, and wherein, in the plate connecting section, the sections of the plurality of sections are connected to each other and positioned via a plate-shaped member.

5. A tire vulcanizer which vulcanizes and molds a green tire placed in an outer mold by heating the green tire from the outer side and the inner side of the green tire, the tire vulcanizer comprising:

an electric platen which is arranged to be in contact with each of the upper and lower sides of a container with the green tire placed therein, or to be embedded in each of the upper and lower portions of the container, so as to heat the green tire from the outside of the outer mold at the time of vulcanization, and is formed into a doughnut-like disc shape and divided into a plurality of sections in the circumferential direction of the platen, wherein the platen includes a plate connecting section in which at least two of the plurality of sections, being adjacent each other, are connected to each other and positioned via a plate-shaped member, and wherein the connection and positioning in the plate connecting section are performed in such a manner that a concave-convex section provided on an upper surface or a lower surface of the platen is engaged with a concave-convex section provided on a lower surface or an upper surface of the plate-shaped member.

6. A tire vulcanizer which vulcanizes and molds a green tire placed in an outer mold by heating the green tire from the outer side and the inner side of the green tire, the tire vulcanizer comprising:

an electric platen which is arranged to be in contact with each of the upper and lower sides of a container with the green tire placed therein, or to be embedded in each of the upper and lower portions of the container, so as to heat the green tire from the outside of the outer mold at the time of vulcanization, and is formed into a doughnut-like disc shape and divided into a plurality of sections in the circumferential direction of the platen, wherein the platen includes a plate connecting section in which at least two of the plurality of sections, being adjacent each other, are connected to each other and positioned via a plate-shaped member, and wherein, in the plate connecting section, at least one of the sections of the plurality of sections platen and the plate-shaped member are connected to each other and positioned via a fastening member.

* * * * *